A. KINGSBURY.
THRUST BEARING.
APPLICATION FILED AUG. 16, 1916.
1,229,291.
Patented June 12, 1917.
2 SHEETS—SHEET 2.
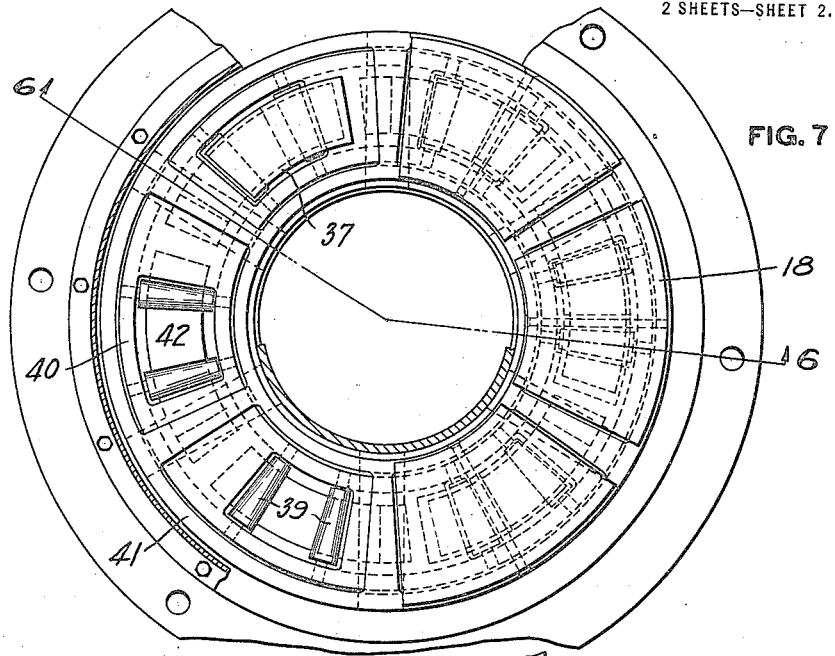
FIG. 7
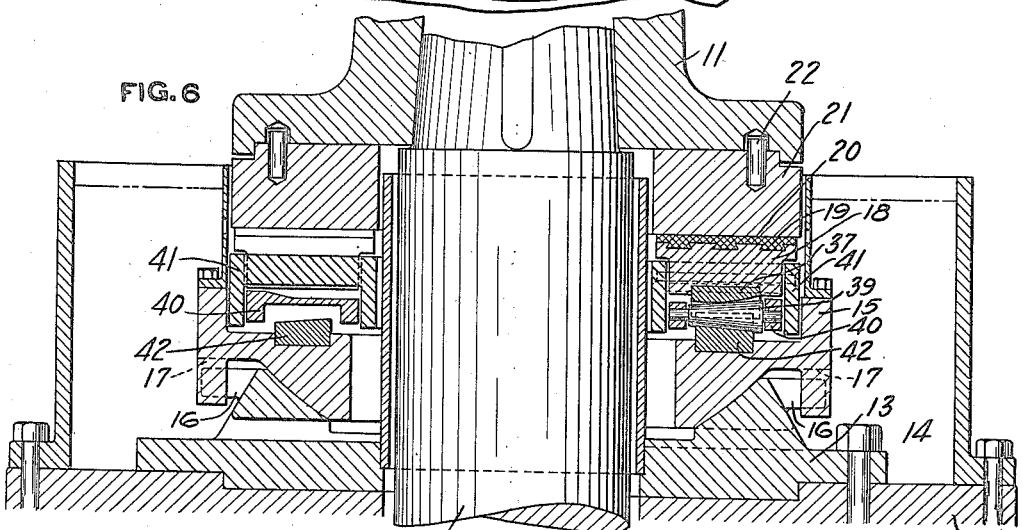
FIG. 6
FIG. 8
FIG. 9
WITNESSES
F. Graves
M. Dunne
INVENTOR
Albert Kingsbury
attorney

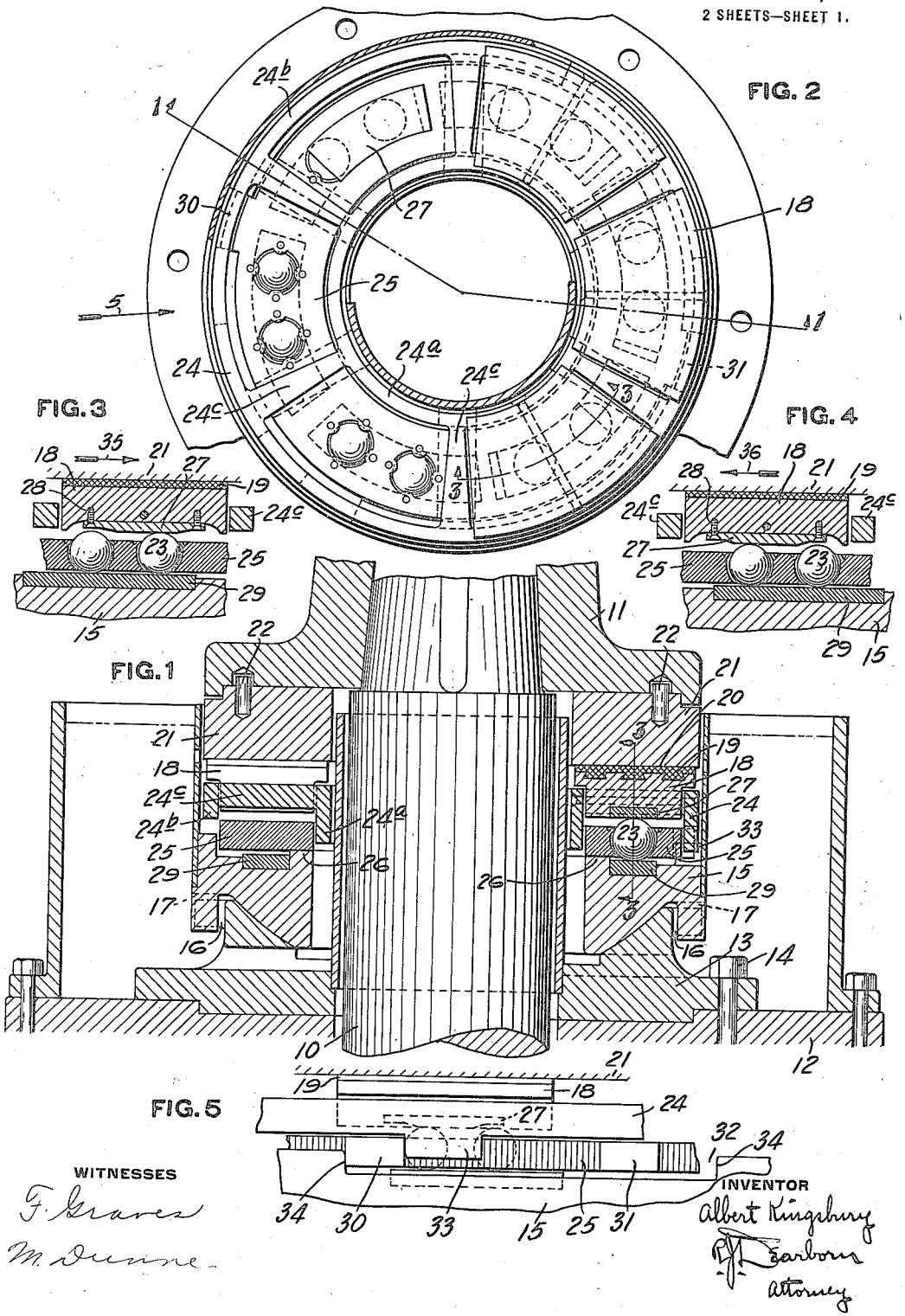

UNITED STATES PATENT OFFICE.

ALBERT KINGSBURY, OF PITTSBURGH, PENNSYLVANIA.

THRUST-BEARING.

1,229,291. Specification of Letters Patent. Patented June 12, 1917.

Application filed August 16, 1916. Serial No. 115,123.

*To all whom it may concern:*

Be it known that I, ALBERT KINGSBURY, of the city of Pittsburgh, county of Allegheny, and State of Pennsylvania, have invented certain new and useful Improvements in Thrust-Bearings, of which the following is a specification, reference being had to the accompanying drawings.

My invention relates to thrust bearings and particularly to bearings of the shoe type which are arranged to operate in either direction of shaft rotation.

One object of my invention is to provide a bearing of the aforesaid character that shall embody simple and effective means for automatically shifting the pivotal point of the bearing shoes dependent upon the direction of shaft rotation, whereby the bearing operates with equal facility and under particularly favorable conditions in either direction.

Another object of my invention is to provide means for materially reducing the force necessarily exerted to overcome the starting friction of a bearing of the shoe type. For example, by arranging the bearing to permit an initial movement of the normally stationary member with the rotatable member, the rotatable member acquires sufficient momentum to materially assist in overcoming the starting friction.

Still another object is to provide a thrust bearing having a plurality of tiltable bearing shoes, a pair of pivotal supports for each shoe, and means for circumferentially adjusting the shoes dependent upon the direction of shaft rotation to render the one or the other of the pivots active.

Other objects and advantages of my invention will be set forth hereinafter, and in order that my invention may be thoroughly understood, I will now proceed to describe the same in the following specification and then point out the novel features thereof in appended claims.

Referring to the drawings:

Figure 1 is a sectional elevation, taken on the line 1—1 of Fig. 2, of a bearing arranged and constructed in accordance with my invention.

Fig. 2 is a partially sectional plan view of the relatively stationary parts of the bearing, the shaft and thrust collar being omitted and some of the bearing shoes removed to disclose the supporting structure.

Figs. 3 and 4 are sectional views both taken on the lines 3—3 of Figs. 1 and 2 and illustrating the relation of one of the shoes to its supports for opposite directions of shaft rotation.

Fig. 5 is a partial elevation looking in the direction of the arrow 5 of Fig. 2.

Fig. 6 is a sectional elevation corresponding to Fig. 1, taken on the line 6—6 of Fig. 7, and Fig. 7 is a plan view corresponding to Fig. 2, of a modified bearing structure which also embodies my invention.

Figs. 8 and 9 are views corresponding to Figs. 3 and 4, of the structure of Figs. 6 and 7.

In the structure illustrated in Figs. 1 to 5 inclusive, to which special reference may now be had, 10 is a shaft to which is secured a thrust block 11. 12 is a stationary base or frame and 13 is a leveling washer which is secured to the base by any suitable means such as bolts 14. Mounted upon the leveling washer is an equalizing ring 15 having a downwardly extending flange provided with notches 17 which are engaged by lugs 16 of the washer. These members have coöperating spherically curved surfaces so that the equalizing ring may perform its function in a well known manner.

Interposed between the thrust block 11 and the equalizing ring 15 are a plurality of bearing balls 23 mounted on the ring, and bearing shoes 18 which are preferably faced with relatively soft metal as indicated at 19 and engage an annular bearing surface 20 of a thrust collar 21. The collar is rotated with the shaft and with the block 11 on account of dowel pins 22 which extend from the collar into suitable recesses in the block.

The shoes are spaced apart and uniformly distributed about the center of the shaft 10 by a shoe cage 24 which, as clearly shown in Fig. 2, is composed of a pair of concentric rings 24$^a$—24$^b$ joined by radial arms 24$^c$.

The bearing balls 23 are held in place by a ball cage 25 which is supported on a flange or projection 26 of the equalizing ring 15.

As clearly shown in Figs. 3 and 4, each of the shoes is provided with a wearing piece 27 preferably formed of hardened steel and held in place in any suitable manner, as for example, by screws 28.

The equalizing ring 15 is also provided with a plurality of wearing pieces 29 which are set into suitable recesses in its top surface adjacent to the flange 26. The arrangement of parts is such that the bearing balls 23 make contact with the wearing pieces 27 and 29 and constitute pivotal supports for the shoes.

The cage 25 is provided with a pair of lateral lugs 30—31 which extend into a notch 32 in the equalizing ring 15. The shoe cage 24 has a downward projection 33 which, as clearly shown in Fig. 5, extends between the lugs 30—31 of the cage 25. The arrangement of parts is such that the shoe cage 24 and the ball cage 25 are free to move independently of the equalizing ring 15 a distance limited by the engagement of the lugs 33 and 31 with each other and the lug 31 with one of the shoulders 34 of the notch 32.

During the movements of the cages the shoes roll on the bearing balls 23 and the bearing balls roll on the equalizing ring 15. The ball cage 25 obviously turns at one-half the speed of the shoe cage and the lugs 33 and 31 and the notch 32 are arranged and proportioned accordingly.

During the movement above described, each of the shoes moves from a position corresponding to Fig. 4 in which it is pivotally mounted on one of the balls 23, to the position of Fig. 3 in which it is pivotally mounted on an adjacent bearing ball, the balls being arranged in groups of two under each shoe as clearly shown in Fig. 2.

The arrows 35 and 36 of Figs. 3 and 4, indicate the direction of shaft rotation corresponding to the illustrated position of the shoe, and attention is directed to the fact that the shoe is tiltably mounted on the forward ball of the pair in each case. The point of support is thus a little ahead of the center of the shoe and is in fact in the most desirable position for automatically producing and maintaining the oil film between the bearing surfaces when the shaft and collar 21 are rotating in either direction.

When the bearing is in operation the shoe cage and the ball cage are substantially at rest and the bearing balls are not utilized except as stationary supports. They are, therefore, subjected to a very slight wear, even though the bearing sustains very high pressure.

When the shaft is operated in a reverse direction the shoes are automatically adjusted to the position shown in Figs. 4 and 5.

It is therefore evident that the shoes are automatically supported with their pivots most advantageously positioned for either direction of shaft rotation.

In addition to this function however, the rotating shaft and its attached parts, are free to start from rest with a minimum expenditure of energy because at starting the friction between the engaging surfaces of the shoes and the collar is relatively high and on the other hand the friction of the ball bearings is very small; hence, the shoes first travel with the collar for a limited distance permitting the rotating parts to acquire sufficient momentum to easily overcome the starting friction of the shoe surfaces when the shoe and ball cages have reached the limit of their movement.

Once the static friction of the shoes contacting with the collar is overcome, oil films are established and the friction reduced to a very small amount, the ratio between the starting and the running friction of the bearing being approximately 100 to 1.

In Figs. 6, 7, 8 and 9, to which reference may now be had, I have shown a modified structure in which rollers are utilized instead of the bearing balls 23, corresponding parts being designated by the same reference characters in all of the figures.

In place of the wearing piece 27 each of the shoes 18 in this modification is provided with a wearing piece 37 having a downwardly extending central projection 38 which limits the movement of the shoes relative to the rollers 39 on which the shoes are tiltably mounted as clearly shown in Figs. 8 and 9. The rollers 39 are rotatively supported in a cage 40 and are frusto-conical in shape, tapering inwardly toward the center of the shaft. The shoes are held in position by a cage 41 which corresponds to the cage 24 except that it has no lugs to coöperate with the roller cage, the projections 38 of the shoes performing this function. The rollers are mounted on wearing members 42 having notches 43 to limit the movement of the rollers and of the roller cage 41 relative to the equalizing ring 15 to which the wearing members are secured. The operation of this structure is practically the same as that of the previous structure, the shoes moving from one of the rollers 39 to the adjacent roller when the bearing is reversed in direction.

What I claim is:

1. A bearing comprising a tiltable bearing shoe, a plurality of members each adapted to pivotally support said shoe, and means for selecting one of said pivot members.

2. A thrust bearing comprising a tiltable bearing shoe, a plurality of members each adapted to pivotally support said shoe, and means automatically dependent upon the direction of bearing operation for selecting one of said pivot members.

3. A thrust bearing comprising a plurality of tiltable bearing shoes, a pair of pivotal members for each shoe, each member being adapted to pivotally support the shoe, and means for selecting a corresponding pivot for each shoe.

4. A thrust bearing comprising a plurality of bearing shoes, a pair of rolling bearings for each shoe, each rolling bearing being adapted to constitute a pivot for one of the shoes, and means automatically dependent upon the direction of bearing rotation for selecting a corresponding rolling bearing for each shoe.

5. A thrust bearing comprising a rotatable member having an annular bearing surface, a plurality of bearing shoes having coöperating bearing surfaces, a pair of rolling bearing members for each shoe, and means for permitting a rotative movement of the shoes relative to the rolling bearings, whereby the shoes may be selectively pivoted on one or the other of its rolling bearings.

6. A bearing comprising a tiltable bearing shoe, means for supporting the shoe on either side of its center in the line of bearing movement.

7. A bearing comprising a tiltable bearing shoe, means for supporting the shoe on either side of its center in the line of bearing movement, and means dependent upon the direction of bearing movement for selectively actuating said means.

8. A thrust bearing comprising a rotatable member having an annular bearing surface, a plurality of bearing shoes coöperating with the annular bearing surface, and means automatically dependent upon the direction of rotation for pivotally supporting the shoes in advance of their centers in the line of bearing movement.

9. A thrust bearing comprising a rotatable member having an annular bearing surface, a plurality of bearing shoes coöperating therewith, a shoe cage loosely holding the shoes in position, a pair of pivot bearing members for each shoe and means for permitting a rotative movement of the shoe cage and shoes, to shift each shoe from one pivot bearing member to another.

In witness whereof, I have hereunto set my hand, this 5th day of August, 1916.

ALBERT KINGSBURY.